United States Patent [19]

Lee

[11] 3,803,363

[45] Apr. 9, 1974

[54] APPARATUS FOR THE MODIFICATION OF THE TIME DURATION OF WAVEFORMS

[76] Inventor: Francis F. Lee, 35 Highland Ave., Lexington, Mass. 02173

[22] Filed: Jan. 17, 1972

[21] Appl. No.: 218,106

[52] U.S. Cl. .......................................... 179/15.55 T
[51] Int. Cl. .......................................... G10l 1/00
[58] Field of Search...179/15 AV, 15.55 R, 15.55 T, 179/100.2 T, 15 A, 1 UW; 340/347 AD

[56] References Cited

UNITED STATES PATENTS

| | | | |
|---|---|---|---|
| 3,621,150 | 12/1971 | Pappas | 179/15.55 T |
| 3,104,284 | 9/1963 | French et al. | 179/15.55 T |
| 3,274,341 | 9/1966 | Allen | 179/15.55 T |
| 3,634,625 | 1/1972 | Geohegan et al. | 179/15 A |

*Primary Examiner*—Thomas J. Sloyan
*Attorney, Agent, or Firm*—Willis M. Ertman

[57] ABSTRACT

Apparatus for modifying the time duration of analog data includes a storage device having a multiplicity of storage locations, means for storing input data samples in consecutive locations in the storage device at a first rate and means for transferring stored data samples from consecutive locations of the storage device at a second rate that may be different from the first rate. The input or stored data is monitored for a particular characteristic and a representation of data having such characteristic is stored. Transfer of a sequence of data samples from the storage device is terminated and transfer of a new sequence of data samples is initiated as a function of the difference between the first and second rates and the stored data representation. The new sequence of data samples is initiated at a storage location that is spaced from the storage location from which the last data sample of the prior sequence was transferred. Smooth transitions are provided between the outputted data sequences.

18 Claims, 11 Drawing Figures

APPARATUS FOR THE MODIFICATION OF THE TIME DURATION OF WAVEFORMS

SUMMARY OF INVENTION

This invention relates to the modification of the time duration of waveforms and more particularly, though not exclusively, to the expansion or compression of audio data such as speech while preserving the intelligibility and quality of the information contained in the data.

When recorded speech is played back at a speed that is different from the speed at which it was recorded, the entire frequency spectrum of the recorded speech is shifted. As the playback speed differential increases, the intelligibility of the reproduced data is degraded. For example, recorded speech when played back at a higher speed has an unnaturally high frequency sound, and when played back at lower speed has an unnaturally low frequency sound. However, it is often desired to compress or expand the playback time. Compression saves listening time while expansion allows a better examination of fast spoken utterances. Another application is of the type involved in real time communication with a diver in a helium environment. The diver's speech has a pitch that is 1.7 times normal speech pitch due to the helium environment.

Several different techniques have been proposed for achieving time compression without altering the pitch of the original speech by deleting segments of the serial speech. Similarly, by repeating segments of speech in a periodic manner, time expansion can also be achieved, again without pitch change. Such speech modification has been implemented with a rotating magnetic head assembly. However, such an assembly is difficult to machine, and due to the optimum segment duration in either the compression or expansion mode, and a physical size limitation on the rotating head assembly, the tape carrying the recorded speech has been driven at a rather high linear velocity. Another technique employs a programmed computer to process the speech, a complex and expensive technique.

It is an object of this invention to provide versatile and relatively inexpensive apparatus for modifying the time duration of audio waveforms and more particularly speech.

In the production of compressed speech by periodic sampling of the speech signal waveform and discarding segments thereof, the objective is to produce a compressed version of the speech which gives the best intelligibility. Factors which affect the intelligibility are the duration K of each kept segment, the duration D of each discarded segment, and the rate at which the original speech was produced. Since the comression process involves chopping out segments of a continuous signal, and the chopping process itself introduces discontinuities which gives objectionable noises, it is desirable to perform the chopping process at as low a rate as possible. The chopping rate is $1/(K+D)$ cycles per second when K and D are both expressed in seconds. This consideration tends to favor large values of K and D. Since K represents the kept interval which is actually heard, it should be sufficiently long to contain at least one pitch period of the voiced speech in order to preserve the pitch of the original uncompressed speech. Because male voice has pitch periods as long as 0.0128 second, K should not be made less than that value. The discarded segment duration D should be shorter than the duration of the shortest phonetic sound transition. Consonants involve changes in vocal track configuration and gives the shortest phonetic sound transition duration. Lehiste and Peterson have reported that those durations range from 0.018 second (for the case of the F sound in the context of the word "fight") to 0.175 second (for the case of the P sound in the word "paid") with an average of 0.060 second. Therefore D should be limited to somewhat less than 0.060 second for best intelligibility. For higher compression factors, it has been found optimum to keep the duration of the kept segments K constant and to allow the duration of the discarded segments D to increase, because the content of the kept segments is what the listener actually hears. These considerations lead to a relation which may be described as follows: for moderate degrees of compression, it is desirable to have relatively long, but not exceeding 0.060 second, discard intervals to minimize the interruption frequency; and for high degrees of compression, it is desirable to maintain the duration of the kept segments above a certain length in order to retain the original pitch of the voiced part of the speech sound.

Accordingly it is another object of this invention to provide novel and improved audio frequency modifying apparatus in which the durations of kept and discarded segments are varied as a function of the compression factor.

Another object of the invention is to provide novel and improved apparatus for modifying the time duration of audio signals that does not employ moving parts other than for the device which is used to provide the input signal, such as phonograph or tape machine.

In accordance with the invention there is provided apparatus for modifying analog input data that includes a storage device having a multiplicity of storage locations each capable of storing a sample of the input data, input means for sampling input data at a first rate and storing the resulting input data samples in consecutive locations of the storage device, monitor means for monitoring the input data for a particular characteristic, storage means responsive to the monitor means for storing a representation of input data having such characteristic, output means for transferring stored data samples from consecutive locations of the storage device at a second rate different from the first rate, and means responsive to the difference between the first and second rates and the contents of the storage means for terminating transfer of a sequence of data samples from the storage device and initiating transfer of a new sequence of data samples from the storage device at a storage location spaced from the storage location from which the last data sample of the prior sequence was transferred.

For time compression the first rate/second rate ratio is greater than one and for time expansion the first rate/second rate ratio is less than one. In particular embodiments, the storage device is a multiple access memory of closed loop or re-entrant configuration. Memory locations are accessed sequentially in a circular manner, at least two access controls are provided and the separation between the storage locations specified by the access controls is variable. Input and output monitors are also provided. The data is monitored for a particular amplitude and direction signal characteristic, and segments of the input data are transferred from the storage device to the output on the basis of the relation between the access controls and the occurrence of such particular signal characteristic in input and output data so that smooth transitions are provided between the outputted data sequences. Transients of the type that would produce annoying audio click sounds in the resulting analog output are thus eliminated.

In a specific embodiment, analog input data in the form of speech is sampled at a continuously variable first rate and each sample is converted to a digital word representation and applied to a random access memory type of storage device for storage under the control of an input pointer (e.g., address register) access control that is incremented at the first rate. An output pointer (e.g., address register) access control, incremented at the second rate, controls the transmission of digital word representations from the storage device to a digital to analog decoder for conversion into analog form. In time compression, the series of input digital words are monitored for positive to negative zero crossing characteristics, while in time expansion, a search for the same characteristic in the output digital words is made in a lead or look ahead offset relation to the output pointer. An indication of each such detected characteristic is saved. An indication of a particular one of such detected characteristics is also saved and when a predetermined relation between input and output access controls is reached on detection of a saved indication in the output data, that segment is terminated and a new segment initiated with the location of the saved particular one. Such retention may be achieved in a variety of ways including storage of a marker in memory with the data having the detected characteristic. In the specific embodiment, a corresponding digital word and an incremented value of the memory address of that digital word are saved. Each such data replaces prior saved data so that the particular saved value is the most recent detected value.

In time expansion in that embodiment, the output pointer is stepped at a faster rate than the input pointer and each segment of digital words transmitted to the digital to analog converter includes some repeated input data. To provide a smooth transition between output segments, when the output pointer approaches within a predetermined amount of the input pointer, a search is initiated in the output data for the same (positive to negative zero crossing) characteristic and upon detection of the characteristic in the output data, the segment of digital words currently being transmitted to the digital to analog converter is terminated and transmission of another segment of digital words is initiated commencing with the saved digital word. The saved memory address value is loaded into the output pointer to identify the next digital word in the segment. Thus, in time expansion a portion of the input data is repeated in the output data and another portion of the input data is discarded (that portion being approximately 1/4 of the memory capacity in duration) so that a smooth transition is provided between transmitted segments.

In time compression in that embodiment, the system has two operating states, a moderate degree of compression operating state in which the discard interval is substantially constant and a higher degree of compression operating state in which the kept portion is substantially constant. In both time compression operating states, the input pointer is stepped at a faster rate than the output pointer and a portion of the input data is discarded. Each most recent positive to negative zero crossing input data item is saved. In the moderate compression operating state, data words are serially transferred from successive memory addresses under the control of the output pointer. When the input pointer is within a predetermined relation to the output pointer as it approaches the output pointer, a search is initiated in the output data for the particular (positive to negative zero crossing) signal characteristic and upon detection of that characteristic in the output data, the segment of successive digital words currently being transmitted to the output line is terminated, transmission of another segment of digital words from memory to the output line is initiated commencing with the saved digital word, and the output pointer is reset to the saved address—the incremented value of the most recent positive to negative zero crossing of the input pointer and continues the new segment of output data. Thus, a substantial portion (approximately 3/4 of the memory capacity in this embodiment) of input data is effectively discarded each time the input pointer "catches" the output pointer.

In the higher degree of compression operating state, the output pointer similarly controls the serial transfer of digital words from the memory. The input pointer controls the serial transfer of digital words to the memory until it reaches a predetermined memory address value. The input pointer is then tethered at that address as a function of sensed positive to negative zero crossings so that further input data is effectively discarded. When the output pointer approaches within a predetermined relation to that memory address, a search for the same characteristic in the output data is initiated. On detection of such characteristic, the output pointer is reset to the address value to which the input pointer is tethered and the tethered input pointer is released so that the serial transfer of input digital words to the memory resumes. In this operating state, each segment of input data transmitted to the output line is of substantially constant duration.

Apparatus in accordance with the invention is particularly useful for economically modifying the time duration of speech signals in an efficient and reliable manner. Time expansion or compression without pitch change is obtained merely by adjusting the signal application rate and the output segments are merged smoothly.

Other features, objects and advantages of the invention will be seen as the following description of a particular embodiment progresses, in conjunction with the drawings, in which.

Figure 1:
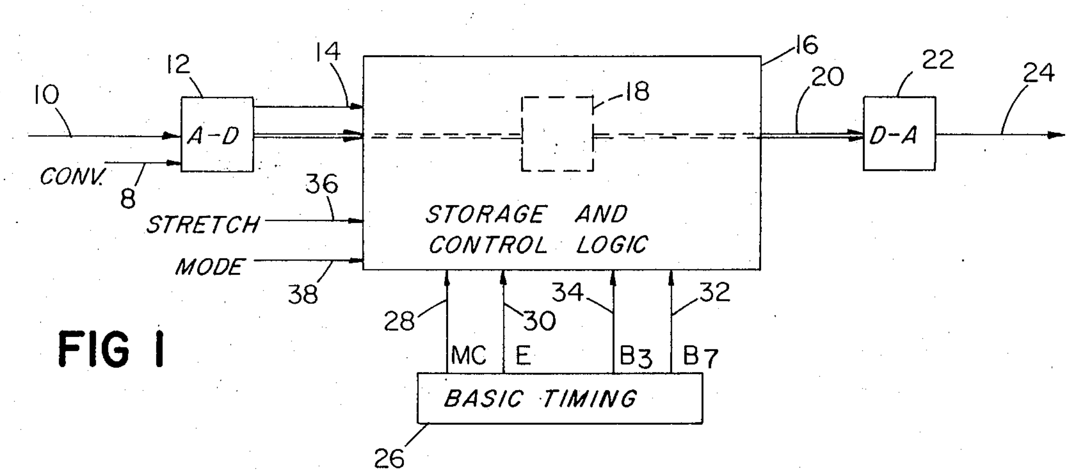
FIG. 1 is a block diagram of a particular embodiment of the invention.
Figures 7A, 7B, 7C:
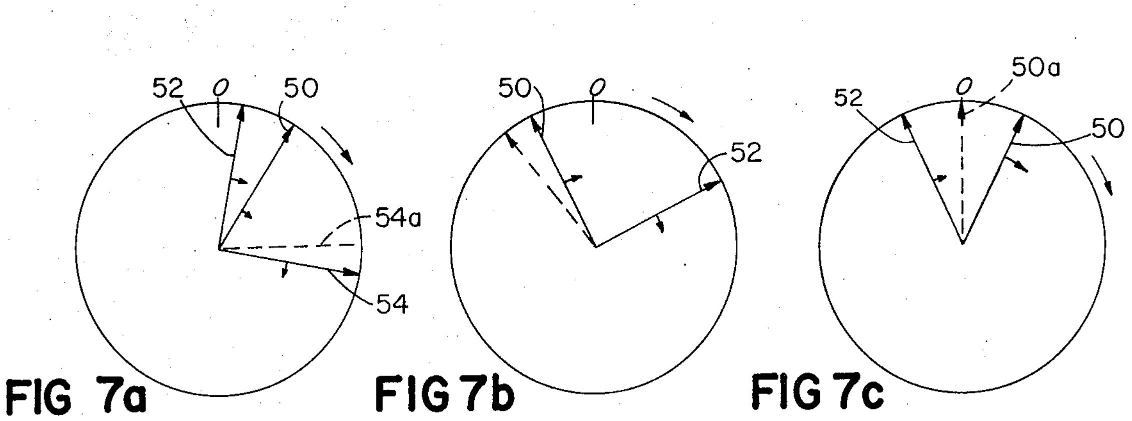

FIGS. **6*a*, 6*b* and 6*c* are logic diagrams of specific components included in control logic 128**; and FIGS. 7*a*, 7*b* and 7*c* are circle diagrams illustrating the characteristics of three different operating states of the system shown in FIG. 1.

DESCRIPTION OF PARTICULAR EMBODIMENT

With reference to FIG. 1, the system includes an input line 10 to which analog input data such as speech is applied from a source such as a magnetic tape playback system having a variable tape transport speed. The rate of application of the input data is variable and proportional to the tape transport speed. The input data is sampled at intervals as a function of the tape transport speed (for example as produced by an optical tachometer sensing the rotation of the tape capstan) as indicated by the CONV signal on line 8 and this sampling frequency at a nominal speed is 16 KHz for this enbodiment. Each such sample is converted to an eight-bit digital word by analog-digital converter 12. When the digital word value of each such sample is available at an input register component of converter 12, the converter 12 generates a DONE signal on line 14 which is applied to Storage and Control Logic 16. In response to the DONE signal the digital word sample is loaded into Memory 18 at the end of the next EVEN signal (line 30) as provided by the Basic Timing Logic 26. Digital words are read out of Memory 18 at the 16 KHz rate (at the end of each B7 time interval—line 32) and over output line 20 to digital-analog converter 22 which converts each digital word to an analog signal level which is applied on output line 24.

Figure 2:
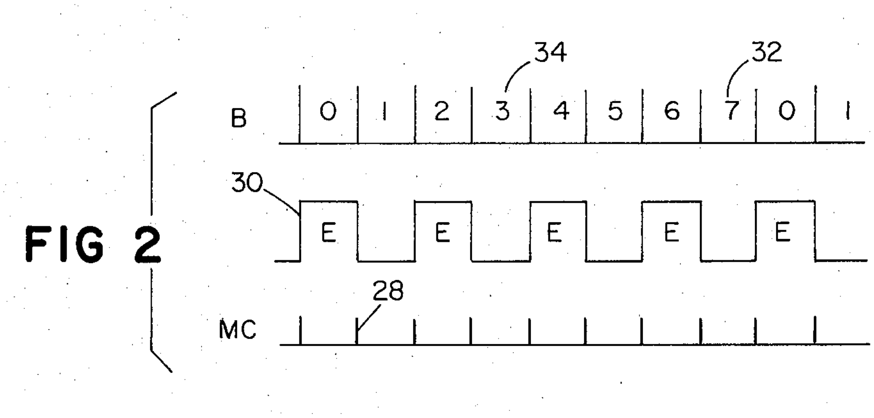
FIG. 2 is a diagram indicating the timing relationship between control signals employed in the system shown in FIG. 1.

The Basic Timing Logic 26 includes an oscillator which operates at the basic clock frequency of 128 KHz and provides MC pulses at the 128 KHz rate on line 28 as indicated in the timing diagram of FIG. 2. A divider chain provides the EVEN signal 30 at a 64 KHz rate and the B3 and B7 signals are each provided at a 16 KHz rate. Whenever an input (Memory Write) operation is requested, it takes place at the end of the next EVEN time (line 30); an output (Memory Read) operation takes place at the end of each B7 time (line 32); and a SCOUT (look ahead) operation is performed at the end of B3 time (line 34).

Figure 3:
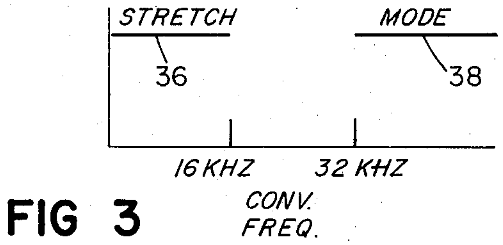
FIG. 3 is a diagram indicating operating states of the system shown in FIG. 1.

The conversion system has three distinct operating states as a function of input sampling rate, a time expansion operating state, a low speed time compression operating state, and a higher speed time compression operating state. As indicated in the diagram at FIG. 3, the system is operating in STRETCH·$\overline{\text{MODE}}$ state 36 if time expansion (input conversion rate less than 16 KHz) is desired. The STRETCH signal 36 may be generated automatically or by a manually operated signal switch. When the input conversion rate is above 32 KHz (the higher speed time compression state), a MODE signal 38 is generated. At a conversion rate between 16 KHz and 32 KHz, the system state is $\overline{\text{STRETCH}}\cdot\overline{\text{MODE}}$.

Figure 4:
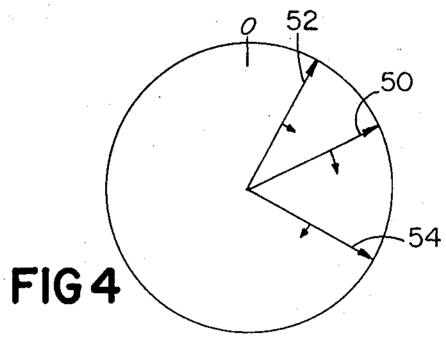
FIG. 4 is a circle diagram representation of system operation.

The memory 18 is a random access memory having a storage capacity of 512 words (addresses 0–511), the word length being eight bits (seven data bits and a sign bit). An indication of system operation may be had with reference to the circle diagram of FIG. 4, which is a representation of the memory system. Three "pointers" are used in this system, Input Pointer 50 which is stepped as a function of the input sampling rate and specifies the sequence of memory addresses at which the series of input digital words representative of the audio input data are normally to be stored; Output Pointer 52 which is stepped at a 16 KHz rate and specifies the sequence of memory addresses from which digital words are normally read out to D-A converter 22; and Scout Pointer 54 which is stepped in synchronism with and leads Output Pointer 52 by 128 memory addresses (one-quarter of the memory capacity).

Figure 5:
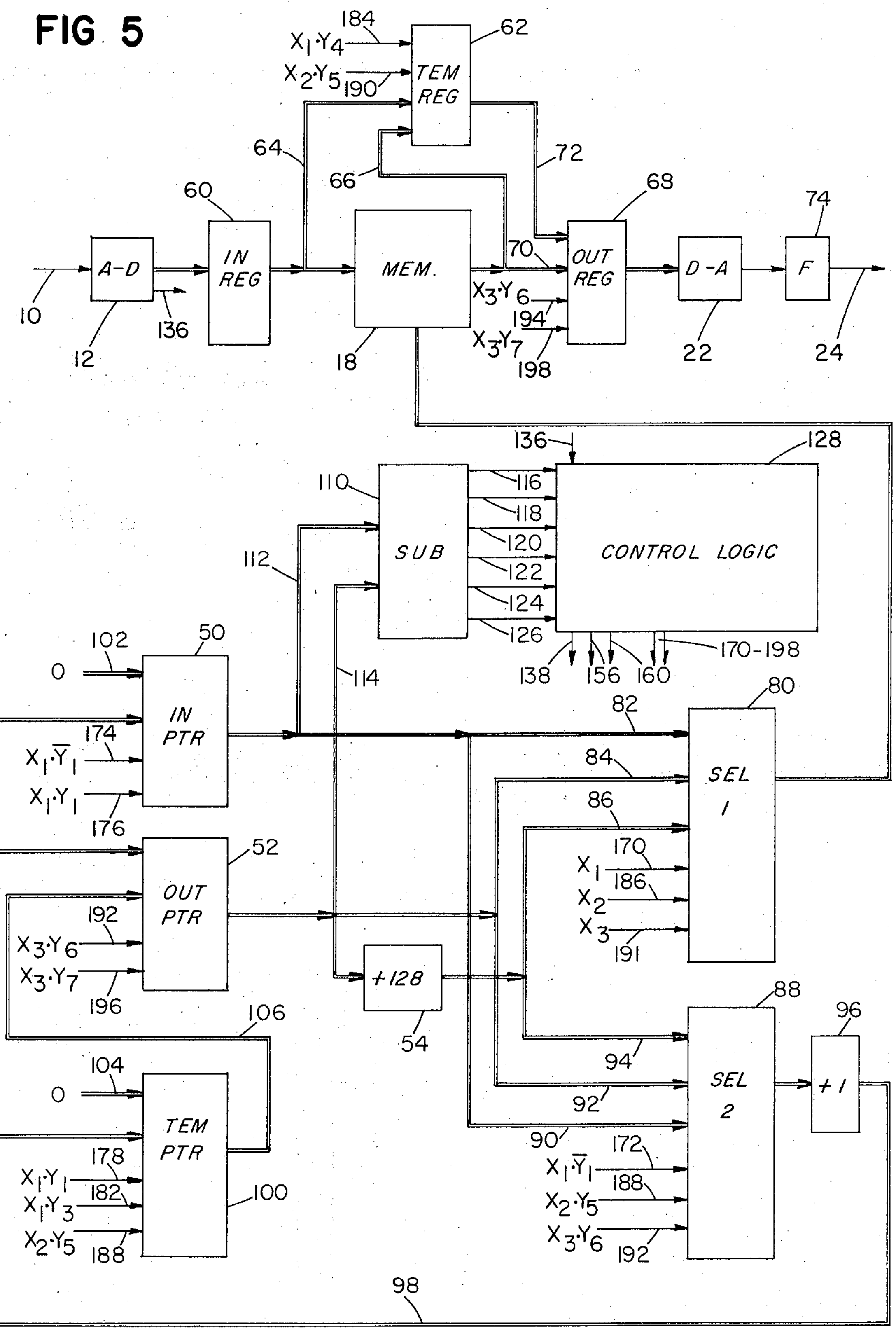
FIG. 5 is a block diagram of details of the system shown in FIG. 1.

Additional details of the system may be seen with reference to FIG. 5. The system includes an Input Register 60 which stores each digital word provided by the Analog to Digital converter 12 for transfer to Memory 18 and, depending on control signals, to Temporary Register 62 over lines 64. The output of Memory 18 may be also applied to Temporary Register 62 over lines 66 and to Output Register 68 over lines 70. The output of Temporary Register 62 may also be applied to Output Register 68 over lines 72. Signals from Output Register 68 are applied to Digital to Analog converter 22 and the resulting analog signal is passed through appropriate processing networks such as filter 74 and then applied to output line 24. Memory address selection is controlled by SELECTOR 80 that has an input from Input Pointer 50 over lines 82, a second input from Output Pointer 52 over lines 84 and a third input over lines 86 from the +128 circuit 54 which defines the Scout Pointer. Both Input Pointer 50 and Output Pointer 52 are nine-bit registers. Signals from the Pointer circuits 50, 52, 54 are also applied to a second SELECTOR circuit 88 over lines 90, 92 and 94, respectively, the output of which is applied to Incrementer 96 whose output in turn is selectively channeled over lines 98 for application to Input Pointer 50, Output Pointer 52 or Temporary Pointer 100. Input Pointer 50 is set to zero by signals on lines 102; Temporary Pointer 100 is set to zero by signals on lines 104; and the setting of Temporary Pointer 100 is transferred to Output Pointer 52 over lines 106. The outputs of Input Pointer 50 and Output Pointer 52 are also applied to Subtractor Decoder Logic 110 over lines 112, 114, respectively. Logic 110 produces six output signals which are applied to Control Logic 128—a $\text{LEAD}_1$ signal on line 116, a LAG signal on line 118, a $\text{LEAD}_2$ signal on line 120, an EQUAL signal on line 122, an INPOINTER =511 signal on lead 124 and an OUTPOINTER=511 signal on lead 126. $\text{LEAD}_1$ is true when Input Pointer 50 leads Output Pointer 52 by zero to 32 counts; LAG is true when Input Pointer 50 lags Output Pointer 52 by zero to 128 counts; $\text{LEAD}_2$ is true when Output Pointer 52 is approaching within 32 counts of O Memory address; EQUAL is true when the outputs of the Input Pointer 50 and Output Pointer 52 are the same; INPOINTER=511 is true when Input Pointer has the value of 511 and OUTPOINTER=511 is true when Output Pointer has the value of 511.

Figure 6A:
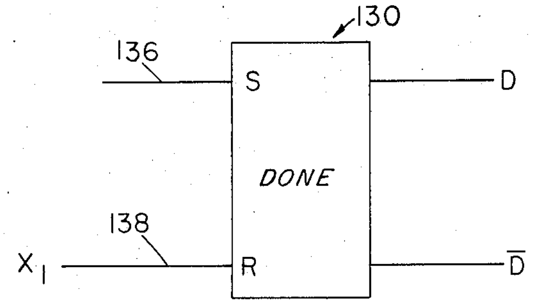
Figure 6B:
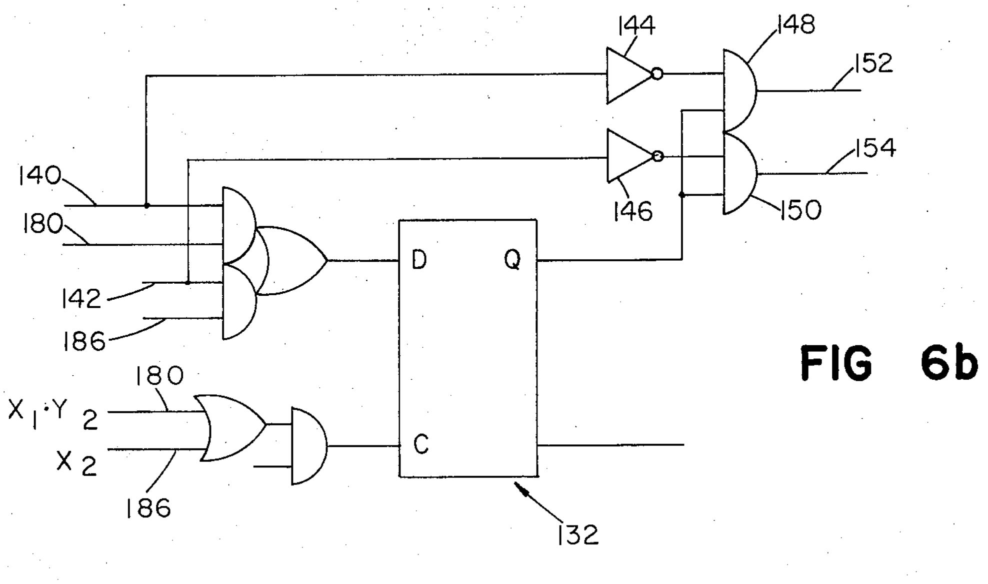
Figure 6C:
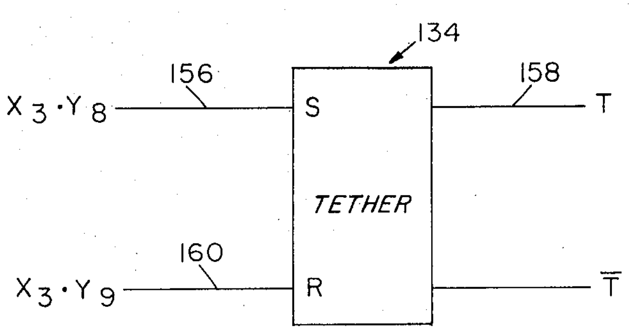

Specific logic components that are included in Control Logic 128 are indicated in FIGS. 6*a*, 6*b* and 6*c*. Those logic components include DONE flip flop 130, zero crossing (PREVSIGN) logic 132 and TETHER flip flop 134. The DONE flip flop 130 is set by a signal on line 136 from analog-digital converter 12 indicating availability of the digital word for transfer to Memory 18, and cleared by the $X_1$ signal on line 138. That signal is generated at the end of the EVEN cycle following the setting of the DONE flip flop ($X_1$=DONE·EVEN).

Zero crossing (PREVSIGN) logic 132 generates a signal indicating the crossing of zero level in a positive to negative direction by means of the comparison between the sign bit of one word and the sign bit of the next word. If the sign of the earlier word was plus (ONE) and the sign of the following word is minus (ZERO), the PREVSIGN logic 132 produces an output. The sign bit value of an input word [INREG(7)] is applied from the Input Register 60 over line 180 as selected by a signal on line 138 at $X_1Y_2$ time when the system is in $\overline{\text{STRETCH}}$ state; while the sign bit value of the word identified by the Scout Pointer 54 (SCOUT(7)) is applied from Memory 18 over line 142 as selected by a signal on line 186 at $X_2$ time when the system is in STRETCH state. The ZERO value sign bit signals of the input and SCOUT words are also applied via inverters 144, 146, respectively, to an input of corresponding AND circuit 148, 150. The output on line 152 indicates an input word positive to negative zero crossing while the output on line 154 indicates a SCOUT word positive to negative zero crossing.

The TETHER flip flop 134 is set by a signal on line 156 at B7 time when the conversion ratio is more than two (MODE state) and the Input Pointer 50 has a value of 511 $[\overline{\text{STRETCH}} \cdot \text{MODE} \cdot \text{B7} \cdot (\text{INPOINTER}=511) \cdot \overline{\text{TETHER}}]$ and produces an output on line 158; and is reset by a signal on line 160 at B7 time when a positive to negative zero crossing is detected at the output, the $\text{LEAD}_2$ signal is generated by the Subtractor Logic 110 or the Output Pointer has a value of 511, namely, $[\overline{\text{STRETCH}} \cdot \text{MODE} \cdot \text{B7} \cdot \text{TETHER} \cdot [\text{LEAD}_2 \cdot \overline{\text{OUTREG(7)}} \cdot \overline{\text{MEM(7)}} + \text{OUTPOINTER}=511]]$ .

These and other Control signals generated by Control Logic 124 during operation of the system are indicated in the following table:

T is TETHER(158)
D is DONE (136)
E is EVEN (30)
F is EQUAL (122)
MEM(INPTR) is the contents of the memory location specified by Input Pointer 50
MEM(SCOUT) is the contents of the memory location specified by Scout Pointer 54
MEM(OUTPTR) is the contents of the memory location specified by Output Pointer 52

An input operation is performed at the end of each EVEN pulse following the setting of the DONE flip flop 130. The input digital word in Input Register 60 is written into Memory 18 at the address specified by the Input Pointer 50 via Selector 80; the Input Pointer 50 is incremented via Selector 88 and Incrementer 96 (except when the TETHER flip flop 134 is set in which event the Input Pointer 50 is reset to zero upon input data crossing zero in the chosen direction). If the system is in $\overline{\text{STRETCH}}$, the input data is also checked for a positive to negative zero crossing via the PREVSIGN logic 132. If a positive to negative zero crossing is detected, the data in the Input Register 60 is also transferred to Temporary Register 62 and the incremented value of the Input Pointer 50 (INPTR+1) is loaded into Temporary Pointer 100. Thus the input data value at the latest positive to negative zero crossing and the corresponding next memory address are saved.

If the system is in STRETCH, at each B3 time, the value of the sign bit of the data word specified by Scout Pointer 54 is sensed by the PREVSIGN Logic 132 and if a positive to negative zero crossing is detected, the

| Control signal | Boolean representation | Function | Reference line |
|---|---|---|---|
| $X_1$ | $D \cdot E$ | DONE ← 0<br>MEM(INPTR) ← INREG | 138<br>170 |
| $X_1 \cdot \overline{Y_1}$ | $D \cdot E \cdot \overline{[\overline{S} \cdot M \cdot T \cdot P \cdot \overline{I_7}]}$ | INPTR ← INPTR + 1 | 172, 174 |
| $X_1 \cdot Y_1$ | $D \cdot E \cdot [\overline{S} \cdot M \cdot T \cdot P \cdot \overline{I_7}]$ | INPTR ← 0<br>TEMPTR ← 0 | 176<br>178 |
| $X_1 \cdot Y_2$ | $D \cdot E \cdot \overline{S}$ | PREVSIGN ← INREG(7) | 180 |
| $X_1 \cdot Y_3$ | $D \cdot E \cdot \overline{S} \cdot \overline{[M \cdot T]} \cdot P \cdot \overline{I_7}$ | TEMPTR ← INPTR + 1 | 182 |
| $X_1 \cdot Y_4$ | $D \cdot E \cdot \overline{S} \cdot P \cdot \overline{I_7}$ | TEMREG ← INREG | 184 |
| $X_2$ | $S \cdot B_3$ | PREVSIGN ← MEM(7) | 186 |
| $X_2 \cdot Y_5$ | $S \cdot B_3 \cdot P \cdot \overline{M_7}$ | TEMPTR ← SCOUT + 1 | 188 |
| $X_3$ | $B_7$ | TEMREG ← MEM(SCOUT) | 190 |
| $X_3 \cdot Y_6$ | $B_7 \cdot [S \cdot \overline{[L_1 \cdot O_7 \cdot \overline{M_7}]}$<br>$+ \overline{S} \cdot \overline{M} \cdot \overline{[L \cdot O_7 \cdot \overline{M_7} + F]}$<br>$+ \overline{S} \cdot M \cdot T \cdot \overline{[L_2 \cdot O_7 \cdot \overline{M_7} + O_{511}]}]$ | OUTPTR ← OUTPTR + 1<br>OUTREG ← MEM(OUTPTR) | 19·<br>192<br>1<br>194 |
| $X_3 \cdot Y_7$ | $B_7 \cdot [S \cdot L_1 \cdot O_7 \cdot \overline{M_7}$<br>$+ \overline{S} \cdot \overline{M} \cdot [L \cdot O_7 \cdot \overline{M_7} + F]$<br>$+ \overline{S} \cdot M \cdot T \cdot [L_2 \cdot O_7 \cdot \overline{M_7} + O_{511}]]$ | OUTPTR ← TEMPTR<br>OUTREG ← TEMREG | 196<br>198 |
| $X_3 \cdot Y_8$ | $B_7 \cdot \overline{S} \cdot M \cdot \overline{T} \cdot I_{511}$ | TETHER ← 1 | 156 |
| $X_3 \cdot Y_9$ | $B_7 \cdot \overline{S} \cdot M \cdot T \cdot [L_2 \cdot O_7 \cdot \overline{M_7} + O_{511}]$ | TETHER ← 0 | 160 |

Where:
S is STRETCH (36)
P is PREVSIGN (132)
M is MODE (38)
$I_7$ is Input Sign bit (INREG(7))
$M_7$ is Memory Output Sign bit (MEM(7))
$O_7$ is Output Register Sign bit (OUTREG(7))
L is LAG (118)
$L_1$ is $\text{LEAD}_1$ (116)
$L_2$ is $\text{LEAD}_2$ (120)
$I_{511}$ is Inpointer=511 (124)
$O_{511}$ is Outpointer=511 (126)

word at that Scout Pointer address is loaded into Temporary Register 62 and the next memory address is loaded into Temporary Pointer 100 in a similar save operation.

At each B7 time an output operation is performed. The data word at the address in Memory 18 specified by the Output Pointer 52 via Selector 80 is transferred from Memory 18 to Output Register 68 unless (1) in STRETCH, a positive to negative zero crossing is detected between the word at the specified memory address and the previous word that is still held in Output Register 68 and Subtractor Logic 110 has a $\text{LEAD}_1$ output (line 116); (2) in $\overline{\text{STRETCH}\cdot\text{MODE}}$, the LAG output (line 118) is present and a positive to negative zero crossing is detected or the EQUAL signal on line 122 is present; or (3) in $\overline{\text{STRETCH}}\cdot$MODE, the TETHER flip flop 134 is set and the $\text{LEAD}_2$ signal (line 120) is present concurrently with the detection of an output data positive to negative zero crossing or Output Pointer 52 has the 511 value. In each of these three events, the data word stored in Temporary Register 62 is transferred to Output Register 68 and the Output Pointer 52 is reset to the value held in Temporary Pointer 100.

Further understanding of the operation of this system may be had with reference to the circle diagrams shown in FIG. 7. When the system is in STRETCH (time expansion-conversion ratio less than one), Input Pointer 50 is being stepped at a slower rate than Output Pointer 52. A transient in the audio output signal would normally occur each time Output Pointer 52 passes input Pointer 50. To minimize or eliminate this output transient, Scout Pointer 54 senses for positive to negative zero crossings in synchronism with and 128 addresses ahead of Output Pointer 52. In each cycle, at B3 time, the sign bit at the Memory address specified by Scout Pointer 54 is read out and compared with the sign bit of the data word in the previous Memory address. Whenever a positive to negative zero crossing is detected, the PREVSIGN circuitry 132 produces an output on line 154 which transfers the data word at the Memory address specified by Scout Pointer 54 over lines 66 to Temporary Register 62 and stores an incremented value of the Scout Pointer (SCOUT+1) in Temporary Pointer 100. Thus the data word at the positive to negative zero crossing is stored in the Temporary Register 62 and the incremented address of that data word is stored in Temporary Pointer 100. When Subtractor Logic 110 produces the $\text{LEAD}_1$ signal (indicating that Output Pointer 52 is less than 33 addresses behind Input Pointer 50), the sign bit of the data word in Memory 18 at the address specified by Output Pointer 52 is compared with the sign bit of the previous output data word (still in Output Register 68) and if a positive to negative zero crossing is detected, the contents of the Temporary Register 62 are transferred to the Output Register in response to a signal on line 198, the value specified by the Temporary Pointer 100 being loaded into Output Pointer 52 in response to a signal on line 196. Those data items are updated on detection of each subsequent positive to negative zero crossing.

Thus, when the system is in STRETCH, the most recent positive to negative zero crossing of the SCOUT data is stored in the Temporary Register 62 and a coordinated address is stored in Temporary Pointer 100. When the Output Pointer 52 approaches within 32 addresses of the Input Pointer 50 ($\text{LEAD}_1$—line 116), a search condition is established which samples the output data for a positive to negative zero crossing condition and on detection of that positive to negative zero crossing condition the contents of the Temporary Register 62 are transferred to the Output Register 68 and the contents of the Temporary Pointer 100 are loaded into Output Pointer 52 so that Output Pointer 52 specifies the next address following the positive to negative zero crossing value that was transferred from Temporary Register 62 to Output Register 68. Thus, the Output Pointer 52 has been jumped past the Input Pointer 50 to the SCOUT positive to negative zero crossing position *54a* (FIG. *7a*), discarding a portion of the input data somewhat less than 128 words in length and splicing the outputted segments at a zero crossing so that there is little or no output transient. The Output Pointer 52 continues to advance at a rate faster than the Input Pointer 50 and will repeat the transmission to the Output Register 68 of some of the data words previously transmitted, for example those at the address indicated at *54a* and subsequent addresses. When Output Pointer 52 next gets within 32 counts of Input Pointer 50, the process is repeated. Thus in time expansion (STRETCH), the system selectively repeats portions of the input data while smoothly splicing the portions to be outputted so that there is no abrupt amplitude and/or direction transition and thus eliminating annoying audio click sounds normally associated with indiscriminate splicings.

An example of system operation in $\overline{\text{STRETCH}}\cdot\overline{\text{MODE}}$ (time compression-conversion ratio between 1 and 2) is indicated in FIG. *7b*, in which Input Pointer 50 is stepped at a faster rate than Output Pointer 52 and a substantially constant portion of input data is periodically discarded, that portion being somewhat less than 512 words. In $\overline{\text{STRETCH}\cdot\text{MODE}}$, the PREVSIGN logic 132 senses the sign bit of each input word as that word is being written into Memory 18 and causes each most recent positive to negative zero crossing data word and a coordinated memory address to be saved in Temporary Register 62 and Temporary Pointer 100, respectively.

At B7 time, Memory 18 is addressed by Output Pointer 52 to read data into Output Register 68. When Output Pointer 52 leads Input Pointer 50 by less than 128, the LAG signal is generated on line 118 which causes Control Logic 124 to compare the sign bit of each previous output word (still in Output Register 68) with the sign bit of the memory output word and upon detection a positive to negative zero crossing, the contents of Temporary Register 62 are transferred to Output Register 68 and the contents of Temporary Pointer 100 are loaded into the Output Pointer 52, thus effectively resetting the Output Pointer to the address of the most recent positive to negative zero crossing of the Input Pointer 50. Thus, several hundred words of input data effectively are discarded. Should the output signal be relatively constant so that a positive to negative zero crossing is not detected as the Input Pointer 50 catching up with the Output Pointer 52, Control Logic 124 resets the Output Pointer 52 to the last input data zero crossing when the EQUAL signal on line 122 is produced by Logic 110.

In $\overline{\text{STRETCH}}\cdot$MODE (time compression-conversion ratio greater than two), the MODE level is provided on line 38, and the TETHER flip flop 134 is utilized. Each data word is read from Input Register 60 into a Memory address specified by Input Pointer 50. Input Pointer 50 is stepped at at least twice the rate of Output Pointer 52. In each input sequence, the sign bit of the data word is monitored and if a positive to negative zero crossing is detected, that data word is stored in Temporary Register 62 and its address, incremented by one, is stored in Temporary Pointer 100. When the Input Pointer 50 reaches 511, TETHER flip flop 134 is set (line 156). With the TETHER flip flop 134 set, on each positive to negative zero crossing, the input data word is loaded into Temporary Register 62 as before but both the Temporary Pointer 100 and the Input Pointer 50 are reset to zero. The input operation otherwise continues as before. Thus in $\overline{\text{STRETCH}}$ MODE the Input Pointer 50 is effectively "tethered" to the zero address after a sequence of 512 input words have been stored in Memory 18.

When the Subtractor Logic 110 produces the $LEAD_2$ output on line 120 (indicating that the Output Pointer 52 is approaching within 32 counts of zero address), the sign bit of each data word to be read out of Memory 18 is compared with the sign bit of the previous word presently stored in Output Register 68 and on detection of an output positive to negative zero crossing the contents of Temporary Register 62 are transferred to Output Register 68, the contents of Temporary Pointer 100 are loaded into Output Pointer 52 and TETHER flip flop 134 is reset by a signal on line 160. The sequence thus continues with each retained portion of input data having a length of about 512 words. Should there be no output positive to negative zero crossing in the transition sampling region, the TETHER flip flop 134 is released when the Output Pointer value reaches 511 so that the output picks up current input data commencing with a zero crossing value.

While a particular embodiment of the invention has been shown and described, other modifications thereof will be apparent to those skilled in the art and therefore it is not intended that the invention be limited to the disclosed embodiment or to details thereof and departures may be made therefrom within the spirit and scope of the invention as defined in the claims.

What is claimed is:

1. Apparatus for modifying analog input data comprising a random access storage device having a multiplicity of storage locations, each capable of storing a sample of the input data, input means including an input address register for sampling input data at a first rate, means for incrementing said input address register at said first rate, and storing the resulting input data samples in consecutive locations of said storage device, monitor means for monitoring said input data for a particular characteristic, storage means responsive to said monitor means for storing a representation of input data having such characteristic, output means including an output address register and means for incrementing said output address register at a second rate different from said first rate for transferring stored data samples from consecutive locations of said storage device at said second rate, and means responsive to the difference between said first rate and said second rate and the contents of said storage means for terminating transfer of a first sequence of data samples from said storage device and initiating transfer from said storage device of a second sequence of data samples commencing with a data sample from a storage location spaced from the storage location from which the last data sample of the prior sequence was transferred whereby the splicing transient between said first and second sequences is reduced.

2. The apparatus as claimed in claim 1 wherein said input means and said output means cooperate with said storage device so that said storage spaces are effectively arranged in closed loop configuration and said data samples are normally stored by said input means in successive storage spaces and transferred from successive storage spaces by said output means.

3. The apparatus as claimed in claim 1 wherein said monitor means senses said input data for a predetermined amplitude and direction characteristic.

4. The apparatus as claimed in claim 1 and further including means operative when said first rate is less than said second rate to cause said monitor means to monitor said input data in said storage device in a predetermined offset relation to the data samples being transferred from said storage device by said output means.

5. The apparatus as claimed in claim 1 and further including means for causing said output means to terminate transfer data samples from a sequence of said storage spaces in response to a predetermined relationship between said input means and said output means.

6. The apparatus as claimed in claim 5 and further including means operative when said first rate is greater than said second rate and responsive to a predetermined differential between said first and second rates for tethering said input means in predetermined relation to said storage device.

7. The apparatus as claimed in claim 1 wherein said input means further includes means for converting analog input data to digital words representations at said first rate and said output means further includes means for converting digital words representations transferred from said storage device to corresponding audio signals at said second rate.

8. Apparatus for modifying analog input data comprising a random access storage device having a multiplicity of serially arranged storage spaces, each capable of storing a sample of the input data, input means including an input address register for sampling input data at a first rate, means for incrementing said input address register at said first rate, and storing the resulting input data samples serially in said storage device, first monitor means for monitoring said input data for a particular characteristic, storage means responsive to said first monitor means for storing a representation of input data having such characteristic, output means including an output address register and means for incrementing said output address register at a second rate different from said first rate for transferring stored data samples from said storage device at said second rate, second monitor means for monitoring data samples transferred from said storage device for said particular characteristic, and means responsive to said second monitor means and the differential between said first rate and said second rate for causing said output means to terminate transfer of data samples from a first sequence of storage spaces and to initiate transfer of data samples from a second sequence of storage spaces offset from said first sequence as a function of the contents of said storage means whereby the splicing transient between said first and second sequences is reduced.

9. The apparatus as claimed in claim 8 wherein said input means further includes means for converting analog input data to digital words representations at said first rate and said output means further includes means for converting digital words representations transferred from said storage device to corresponding analog data signals at said second rate.

10. The apparatus as claimed in claim 8 wherein each said monitor means senses said input data for a predetermined amplitude and direction characteristic.

11. The apparatus as claimed in claim 10 and further including means operative when said first rate is less than said second rate to cause said monitor means to monitor said input data in said storage device in a predetermined offset relation to the data samples being transferred from said storage device by said output means.

12. The apparatus as claimed in claim 10 and further including means operative when said first rate is greater than said second rate and responsive to a predetermined differential between said first and second rates for tethering said input means in predetermined relation to said storage device and for releasing said tether in response to said second monitor means.

13. Apparatus for modifying the time duration of analog input data comprising:

a random access memory having a multiplicity of storage locations, each said storage location being capable of storing a sample of the input data, an input address register coupled to said memory, the output of said input address register identifying the address of an individual one of said storage spaces in said random access memory into which an input data sample is to be stored, an output address register coupled to said multiple access memory, the output of said output address register identifying an individual one of the storage spaces in said random access memory from which a stored data sample is to be transferred, input means for sampling said analog input data at a first rate and storing the resulting sequence of input data samples in consecutive locations of said memory under the control of said input address register, said input means incrementing said input address register at said first rate to identify said consecutive locations in said memory in which said input data samples are to be stored, output means for transferring stored data samples from consecutive locations of said memory at a second rate different from said first rate under the control of said output address register, said output means incrementing said output address register at said second rate to identify said consecutive locations in said memory from which said stored data samples are to be transferred, comparison means for comparing the memory address output signals from said input and output address registers, and means responsive to a predetermined difference between th output signals from said input and output address registers as detected by said comparison means for changing the setting of one of said address registers to terminate data sample transfer with a first sequence of consecutive memory storage spaces and to continue data sample transfer with a second sequence of consecutive memory storage spaces, the first storage space in said second sequence being spaced from the last storage space in said first sequence, said apparatus reducing the splicing transient between said first and second sequences of data samples.

14. The apparatus as claimed in claim 13 and further including monitor means for monitoring said input data for a predetermined amplitude and duration characteristic.

15. The apparatus as claimed in claim 13 and further including means operative when said first rate is greater than said second rate to restrict the stepping of said input address register relative to a predetermined address of said multiple access memory, and means responsive to a predetermined offset relation between the output of said output address register and said predetermined address for releasing the restriction on the stepping of said input address register.

16. The apparatus as claimed in claim 13 and further including monitor means for monitoring said input data for a predetermined amplitude and direction characteristic, and an auxiliary address register for storing the address of the storage location in said memory of the most recent data sample that has said predetermined amplitude and direction characteristic.

17. The apparatus as claimed in claim 16 and further including means, operative when said first rate is less than said second rate and responsive to an indication from said comparison means that the output of said input address register is in a predetermined offset relation to the output of said output address counter to cause storage of address information in said auxiliary address register under control of said monitor means.

18. The apparatus as claimed in claim 17 wherein said input means further includes means for converting analog input data to digital words representations at said first rate and said output means further includes means for converting digital word representations transferred from said memory to corresponding analog signals at said second rate.

* * * * *